United States Patent
Ellis et al.

(10) Patent No.: US 8,195,630 B2
(45) Date of Patent: Jun. 5, 2012

(54) SPATIALLY ENABLED CONTENT MANAGEMENT, DISCOVERY AND DISTRIBUTION SYSTEM FOR UNSTRUCTURED INFORMATION MANAGEMENT

(75) Inventors: John R. Ellis, Del Mar, CA (US); Michael T. Hornbeek, Poway, CA (US); Mark Meadows, San Diego, CA (US)

(73) Assignee: BAE Systems Information Solutions Inc., Arlington, VA (US)

( * ) Notice: Subject to any disclaimer, the term of this patent is extended or adjusted under 35 U.S.C. 154(b) by 508 days.

(21) Appl. No.: 11/978,419

(22) Filed: Oct. 29, 2007

(65) Prior Publication Data
US 2009/0112812 A1     Apr. 30, 2009

(51) Int. Cl.
*G06F 17/30* (2006.01)

(52) U.S. Cl. ........ 707/696; 707/706; 707/707; 707/708; 707/709; 707/710; 707/755

(58) Field of Classification Search .................. None
See application file for complete search history.

(56) References Cited

U.S. PATENT DOCUMENTS

| | | |
|---|---|---|
| 2002/0143871 A1 * | 10/2002 | Meyer et al. ................. 709/204 |
| 2003/0200192 A1 * | 10/2003 | Bell et al. ........................ 707/1 |
| 2004/0158584 A1 * | 8/2004 | Necsoiu et al. ............ 707/104.1 |
| 2004/0225665 A1 * | 11/2004 | Toyama et al. .............. 707/100 |
| 2005/0033733 A1 * | 2/2005 | Shadmon et al. ................. 707/2 |
| 2007/0106499 A1 * | 5/2007 | Dahlgren et al. .............. 704/10 |
| 2007/0112777 A1 * | 5/2007 | Field et al. ..................... 707/10 |
| 2008/0189249 A1 * | 8/2008 | Petakov et al. .................. 707/3 |

* cited by examiner

*Primary Examiner* — Baoquoc To
(74) *Attorney, Agent, or Firm* — Daniel J. Long; Robert K. Tendler

(57) ABSTRACT

What is provided is a spatially-enabled content management system in which unstructured information is data mined for location or spatial references, with the search query including not only the spatial reference that has been provided by the data mining but also other search query terms, thus to provide an analyst with rapid geo-searching for unstructured information management.

18 Claims, 1 Drawing Sheet

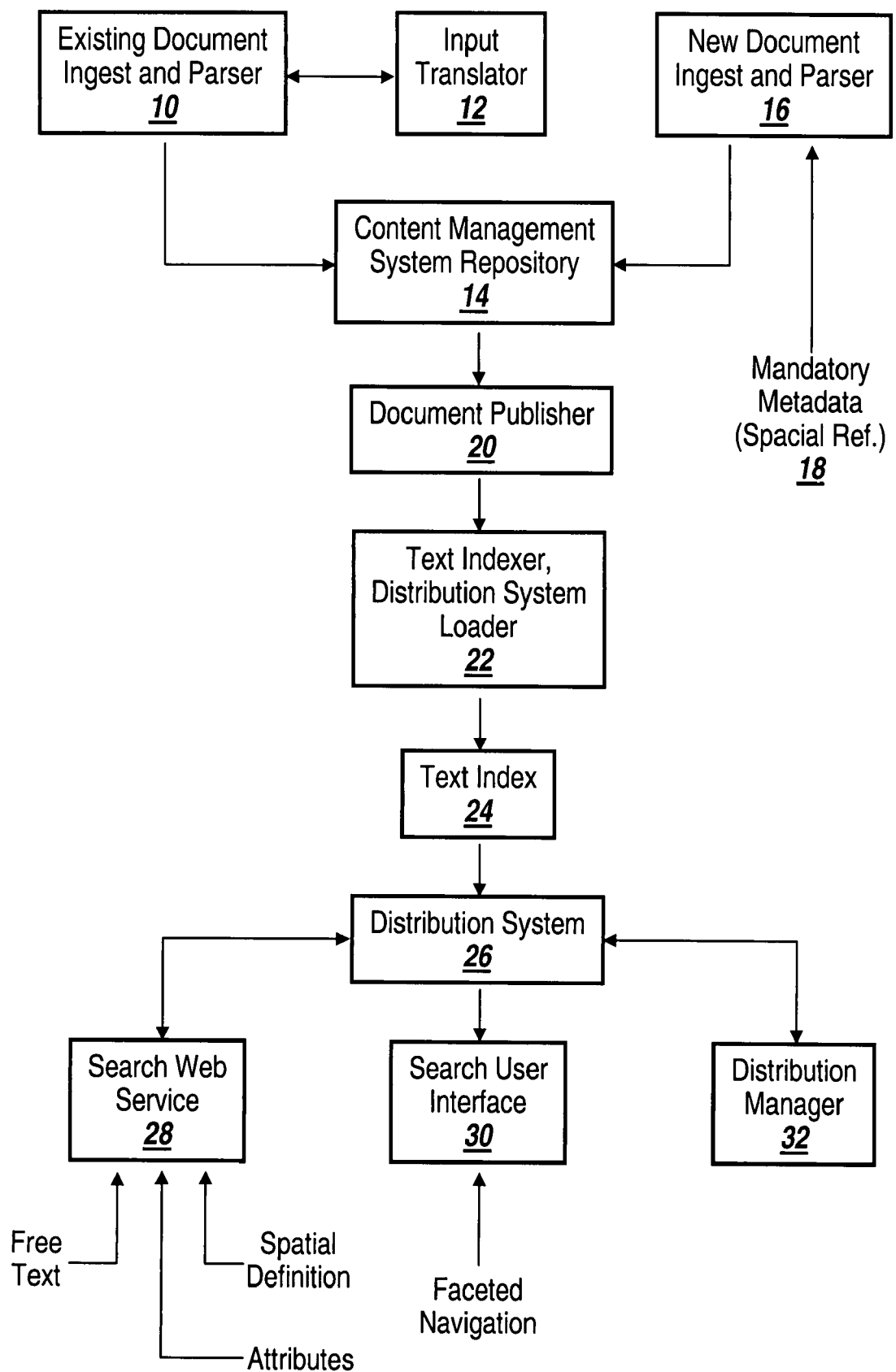

SPATIALLY ENABLED CONTENT MANAGEMENT, DISCOVERY AND DISTRIBUTION SYSTEM FOR UNSTRUCTURED INFORMATION MANAGEMENT

STATEMENT OF GOVERNMENT INTEREST

This invention was made with United States Government support under Contract No. 2003-K-0440900-000 with the National Geospatial Intelligence Agency. The United States Government has certain rights in this invention.

FIELD OF THE INVENTION

This invention relates to a spatially enabled content management discovery and distribution system for unstructured information management and more particularly to a system for rapid querying of unstructured information utilizing spatial searching.

BACKGROUND OF THE INVENTION

Many government and civilian organizations produce an exceptionally large volume of reports. For various government agencies and civilian entities there may be several reports published per hour. At least for some governmental agencies, these reports are available for searching using a search engine such as Google. The search engine regularly crawls the governmental or civilian document repository to parse the text of the documents and update its search index.

For analysts looking for a particular document, they enter a search term into the search engine that returns a set of documents or links to documents that match the text search. Some of these systems also categorize the documents by the day, month and year they were published and some documents may also be categorized by topic. One can browse the documents using a topic or date search, with summaries of the documents and links to them being returned.

For analysts seeking the content of these reports, the analyst must choose or guess the right set of key words to obtain good search results. If one guesses the set of key words too narrowly, the search will miss reports that the query party might be interested in. If one guesses too broadly, one can end up with an overwhelming number of hits. The result of course is that the analyst does not have time to go through all of these documents.

It is therefore very difficult to run an accurate and focused search for material in these written reports.

Another large problem associated with such a reporting system is that an analyst may be very interested in the location in the world where the report is either published or refers to. Current content management systems have no ability to do what is called spatial searching, which typically involves drawing an area on a map, for example, and showing any reports that reference any points inside the area that is drawn. It would be highly desirable to make such a spatial query and to display the results of the search plotted adjacent the corresponding points on the map.

A benefit of spatial visualization of search results is to ascertain where clusters of reports in some area exist and for which the analyst may not be aware that related activity is going on.

All content management systems store metadata, i.e. data about data, with each content item. Typical metadata includes title, author and publication date, such as is used by a card catalog in a library. This metadata can be searched, for example to find all documents by a particular author. The augmentation of this typical metadata with spatial location data is required to support spatial searches.

In order to support spatial searches, there is a necessity for a system to mine the content of documents for either explicit or implicit geographic references, and to convert these geographic references into geographic metadata, which can be later processed by a spatially enabled relational database management system that can process spatial queries.

While in the past simple searches where geo-coding is utilized to indicate for instance a business establishment and its location, usually by street address and zip code, present query systems for unstructured information do not allow the type of search that is commonly referred to as geo-coding.

There are two issues at stake in developing a spatially enabled query system. One is extracting spatial location information from documents, and the other is using this spatial information along with other metadata and text information to perform focused searches over a large collection of documents. Geographic information may be provided explicitly in a document as geographic coordinates. More common is implicit information like the name of the city or data facility inside the body of the document that one can transform into an explicit geographic coordinate.

Ascertaining the coordinates is only one part of the problem to be solved. What one needs is a method to utilize these coordinates in searching. Current content management systems for searching unstructured information have no spatial search capability.

For instance, if there have been a series of drug trials that a pharmaceutical company has run over a period of time and the results of the trials are written into documents, and assuming the documents are stored in a content management system for safekeeping over time, presently there is no easy way for a researcher to find out what people have done what trials, when and where.

For instance, the researcher might be interested in learning about drug trials for tropical diseases, in which countries these trials have been held and over what time periods. The analyst might be looking for specific references inside the report about adverse reactions to a particular drug for a tropical disease and where the adverse reactions occurred.

This information cannot typically be ascertained by a computer-generated index of text documents in a large repository so as to be able to cull out the most relevant documents. This is because there are three things that need to be incorporated into an efficient unstructured information search. One is the location of things or places within the content of the individual document. Secondly, one wishes to search using data about the documents (metadata), analogous to a card catalogue at a library. For instance, one may be interested in a particular author who is an expert in a given field and one would like to find reports that were published by that particular author. Likewise there may be a date range that the investigator is interested in, for instance knowing what happened in a particular field in the late 1970s such that the focus of the search is over that time span.

A third parameter for the search is specific words or phrases that are important to the researcher, assuming that these words and phrases are mentioned in the text.

What is therefore necessary is a system that combines all three of the different ways of searching into what is ultimately just one query in which the search is done automatically to find the intersection of the three types of results and to return a list of specific reports to retrieve and read. If such a system could be devised it would save considerable time. This would allow one to specify a focused query for accurate results while looking through thousands or millions of documents in a repository.

For purposes of the subject invention, unstructured information is data such as documents that are not normally stored in tables in a relational database management system. Examples are text documents, email messages, video clips or pictures. They are difficult to search with any precision beyond what is provided by a simple text-based search that matches user-provided words with word matches found in the body of the document. When text-based searching a large body of documents, these types of searches often provide hundreds or thousands of results, which would be much too time-consuming to read.

For those applications where the locations of entities are described in the body of the content or in its metadata, location is an important search attribute. Presently there are no content management systems that enable focused unstructured information searching and/or discovery based on the explicit or implicit spatial attributes of the content.

SUMMARY OF INVENTION

The subject invention utilizes a combination of techniques to search the spatial attributes of a body of documents; or to research the spatial attributes of an individual document. Whether the spatial attributes are explicit within the document or implicit, they are pre-processed and stored in metadata in a spatially enabled relational database management system. The stored information is thereafter used for focused searches that enable the user to find documents that contain references to entities within a user-defined geographic area and/or contain user-defined key words, i.e., free text, as well as to be able to input attribute values such as range of dates for when a document is published.

Specifically, the subject invention extracts, augments, stores and manages metadata from each content item to enable precise searches that may combine any combination of attribute values such as a publication date range, text and word matches found within the body of the document, coupled with spatial searches relating to an area around a given place name, or a user-defined location on the earth's surface.

The subject system therefore permits using a single query that could, for instance, find documents that mention "President Putin" in their text and were published between March and July 2007 that made references to locations within 100 miles of Moscow. The subject system can handle both new documents as well as existing documents.

By way of background, in typical usage of content management systems there are people who produce documents and there are people who are consumers of these documents including people who are readers. The subject system supports both producers and consumers of the information.

The system operates in two modes. One is a bulk ingest of existing documents and the other is a mode involving a live feed into the system for new documents.

As mentioned above, unstructured data is information that is not normally stored in tables in a relational database management system. While the metadata is stored in tables and while it is very simple to do operations on this structured data, it is much more difficult to perform searches on unstructured data. It will be appreciated that unstructured data is not readily or naturally stored in tables in a relational database system, with examples being documents, email messages, video clips or pictures.

It is a part of the subject invention that the unstructured information be characterized by metadata. For instance, if one had a handheld picture-taking device such as a camera or camera phone and traveled the world taking pictures, one would want to know when the picture was taken, where it was taken and what the subject of the picture was. With the addition of this metadata to the unstructured information processed by the subject system, the unstructured data becomes searchable and discoverable.

One of the key elements in the subject system is the input translator that automatically processes documents that are ingested into a repository to extract and augment metadata in order to be able to understand the document.

For instance, a technical report might have a title, an author and a publication date. There may also be some key words that are specific to the document domain, with this information usually being relatively easy for a computer-based parser to find. Note that this first set of metadata attributes is easily accessible because it is easily parsed using typical text parsing techniques.

But there are some other metadata fields that may be more difficult to find, usually ones having spatial or geophysical references.

Some of these references in a document may be explicit. The document may, for instance, refer to Paris, France.

Secondly, especially for military reports there is a coordinate system known as the Military Grid Reference System. This system is one that is fairly easy to transform into geographic coordinates of latitude and longitude. Moreover, there may be other types of information within a report that one can decode using various techniques to transform the data into latitude and longitude.

For instance, knowing a place name, one can go to a gazetteer to provide a lookup of the latitude and longitude for the place name.

Regardless of how gleaned, the spatial information in a report or document is stored as geographic (latitude/longitude) coordinates in a metadata tag. It is this process of parsing a document and determining which locations are being described in that document that creates the spatial metadata that is later used by the system to perform spatial searches.

While the above relates to existing documents, an input translator function may be applied to new documents. However, one advantage of processing new documents is that through software one can enforce the provision of metadata on the document while it is being generated. These documents might require the author to explicitly enter the data and the system enforces these controls during document generation so that when one is inputting a new document into the system, all of the required metadata will be pre-encoded. Thus, as part of the subject invention, the system may prevent ingesting a document unless all of the required metadata fields are inputted.

In one embodiment, the document with its metadata makes it way through the system and is stored in a content management repository. The repository stores the current version of the document plus any previous versions, who the creator was, and if it was checked out and edited, and who did so and when. This provides a long-term archive vault that stores the document. From there the document is published to a distribution system where other people can discover and retrieve it. In the publication process, a copy of the data plus a copy of the metadata is transmitted it to the distribution system, which is built on a spatially-enabled relational database system to store the metadata and an area on the file system that stores the actual content of the document in a file or files. Included in the distribution system is a web server that provides a user interface to specify search parameters and to display search results.

Thus a PDF file or a Word document is moved from the content management system's repository to the distribution system along with the metadata for that report. As a result, the report becomes available, meaning that it is discoverable by users of the distribution system.

The reason for separating the content management system and the distribution functions is that the content management system of the subject invention is a long-term archive. It has very strict controls over editing access to it and it maintains the history of the document. Every time a document is updated it will be republished to the distribution system that is a read-only system to other users. Thus in the distribution system, being a read-only system, a larger community of users can have access to the data but are not allowed to change it. On the other hand, the content management system of the subject invention allows changes to a document by authorized users.

The reasons to have two separate systems are, first, from a technical point of view, one typically has a lot more end users who are doing research and retrieving documents than one has creators of documents. One would therefore want to have different capacity hardware for each of the two systems.

Another reason for the separation is that even though the content management system has a relational database management system to manage the metadata, its relational database management system is not spatially enabled. Thus, one cannot do spatial searches on it. One can store spatial attributes in its metadata tables, but one simply cannot search spatially; and that is a technical limitation of the content management system.

On the second system, a spatially enabled relational database management system is provided. When a new report is published, both the text of its content is indexed as well as certain metadata values such as the title and the author. The reason is that by indexing the search one can do a free-text "Google-like" search in which the system will look inside the text of the document and inside the meta-fields that have been indexed. Thus, if one has entered an author's name, for example, in the search term one would find documents that were written by that author as well as documents that mention that author.

After indexing, the document is stored in the distribution system along with the metadata. At this point it is available for searching.

The distribution system provides an interactive user interface implemented in one embodiment as a portlet inside a portal that provides the user with the ability to search the documents. The subject system provides a form that allows one to enter attributes, attribute values or ranges and to pick various meta-fields.

For instance, if there was a particular author that one was interested in in a particular country, then assuming the report has a country code associated with it, the search would be narrowed to authors from that country.

In one embodiment, the interactive tool includes a map display where one can pan or zoom until one finds a geographic area of interest. The system then uses the coordinates of the corners of the currently displayed map location to limit the search.

It is a feature of the subject interactive interface to permit entering a place name and then commence searching a given radius around the point associated with the place name to find anything that was published or mentioned, for instance, within 200 miles of the named place. The system uses a gazetteer to translate the place name into geographic coordinates, and then uses a spatial operator of the relational database management system to constrain the search area to a circle of that radius around the location of the point.

With respect to the search interface, the results could be reported in a number of different ways. One could obtain a hit list with links to the documents that meet the search criteria along with a very short summary of what the document is about. One could therefore peruse the list to see if any documents are of interest, and then click on the corresponding link to open the document.

If one is using a map, in one embodiment the subject invention displays points on the map that are links to documents, with the point showing a geographic location within the document that is referenced. If one moves the cursor over any of these points, in one embodiment a bubble will open that shows the title of the document and a link to it as well as a short summary, all in a mouse-over operation.

The subject search interface may also utilize faceted navigation in which the information is organized in a series of facets that lets one drill down through a hierarchy of categories. This operates in a browsing-type fashion as opposed to searching or querying.

For instance, if one is interested in tanks that are used by the Pakistani Army, the user first browses to Pakistan and then the Pakistan Army, then for weapons systems in which he or she can locate tanks.

In summary, what is provided is a spatially-enabled content management system in which unstructured information is data mined for location or spatial references, with the search query including not only the spatial reference that has been provided by the data mining but also other search query terms, thus providing an analyst with rapid and focused spatial, attribute and text searching for unstructured information management.

BRIEF DESCRIPTION OF THE DRAWINGS

These and other features of the subject invention will be better understood in connection with the Detailed Description, in conjunction with the Drawings, of which:

FIG. 1 is a flow chart showing the ingest of either existing documents that have been parsed by an input translator for spatial references, or new documents provided with mandatory meta-tags, at least one being a spatial reference, the placing of the result in a content management system, and the publication of the meta-tagged document overlain with a text index such that the document may be searched for spatial content.

DETAILED DESCRIPTION

Referring to FIG. 1, as illustrated at 10, an existing document is ingested and parsed utilizing an input translator 12, which scans the document for both explicit and implicit spatial references, with spatial and other references being meta-tagged. The result is then coupled to a content management system repository 14.

New document ingest and parser 16 is a real-time document ingesting system in which mandatory metadata 18 must be entered into appropriate fields during the creation of the document, with at least one of the meta-tags having a spatial reference. The meta-tagged new documents are then loaded into the content management system repository 14.

New content in content management system repository 14 is read out or published to a document publisher 20, a software process, that publishes each new document as soon as it has been ingested into the content management system's repository.

Data from the document publisher 20 is indexed by a text indexer 22 in a distribution system loader in which the indexer updates a text index 24.

Thereafter, the newly published content, metadata, and updated text indexes are stored in a distribution system 26, which is accessed by a search web service 28, a user interface 30 or a distribution manager 32.

As illustrated, the search web service may institute queries in terms of free text, attributes and spatial definitions that define a geographic search area, in one embodiment defined by either a radius around a central point or a rectangular area defined on a map.

More specifically, existing documents are read into the system or ingested at 10 through input translator 12, which is configured for each document type. The translator extracts metadata from the document, including title, author, publication date, keywords that are specific to the particular domain, and any explicit geographic or spatial references, such as the latitude and longitude of a location described in the document. Then the input translator searches for implicit spatial information, such as place names, which it converts to geographic coordinates by using a gazetteer. Other implicit spatial information found within the document or its metadata, such as the Military Grid Reference System, are also extracted and converted to geographic coordinates by using look-up tables or coordinate conversion software. These processes of converting implicit or explicit spatial references into geographic coordinates are sometimes called "geo-tagging."

New documents may be created using the content management system's configurable lifecycles and workflows at ingest and parser 16 to define how a document may be created, edited and approved for publication. As part of these workflows, the system will ensure that newly created documents include mandatory metadata 18 before they can be checked in. This metadata will include spatial references.

The content management system's data repository 14 stores all in-work documents, previous versions, and the currently published version. The repository is managed by the content management system.

When a newly created document is approved for publication, or when a set of documents that have completed processing through the bulk ingest step, the publication process sends the document or documents and the associated metadata to document publisher 20, which publishes the currently published version of each document.

When the document publisher receives new data, it indexes the text and certain metadata values (such as title and author) at 22 and updates the results in a text index 24. This index supports free text or keyword searching, similar to a basic "Google" search. The spatial information sent with the metadata is stored in spatial attributes, and theses spatial attributes are stored in the distribution system 26 for spatial searching.

After indexing new content, the results are stored in the distribution system 26. The metadata is stored as a record in a spatially enabled relational database management system, and the document is stored on a file system. A link to the location of each document file is maintained with each metadata record. The spatially enabled relational database management system is necessary to perform the spatial searching operations that this system provides, as part of distribution system 26.

A web service 28 provides other applications the ability to search for documents in the current published content repository through distribution system 26, using any combination of keywords (free text), attributes (such as a date range, a title, or author) or by a spatial definition. One embodiment supports spatial searches defined by four corners of a rectangle expressed as latitude and longitude values, or a circular area defined as the center point latitude and longitude and a radius about that point expressed in nautical miles.

In one embodiment a short description and a link to of any document that meets the search criteria will be returned through the web service. The application may then open any of the documents through the provided link.

Interactive user interface 30, implemented in one embodiment as a portlet in a portal, provides the same search and retrieval capabilities as described in the web services capability. This interactive user interface provides a form to enter attribute values or ranges as well as free text for the search. In addition, it uses a map display that the user may pan and zoom to set a geographic search area, and has a gazetteer to find the geographic coordinates of a place name. The search area may then be set as a circular region, centered around that place with a user-defined radius.

When the search results are found, the system plots their location on the map as points. With a "mouse-over" action the system displays the document title, a summary of its metadata, and a link, which may be clicked to open the document. With these capabilities, the user may detect spatial patterns in the distribution of data in the system that would not be obvious from a simple listing of search results.

In addition, a "faceted navigation" browsing capability is provided to enable a user to browse through the document collection by topic and subtopics through numerous levels, in a manner similar to the use of taxonomy. The various facets are derived from the metadata model. For example, geographic facets could be continent, country, state or region. At each level the system reports the number of documents in the collection that fit within that category. The user may choose to display the list and select and open any of the documents from links provided in the display list.

Distribution manager 32 with a subscription service allows a user to register events, locations, or topics of interest with the distribution manager, and when a new document is published that meets these criteria, the user will be sent a notification. The notification could be by email, or by RSS, or other method as preferred by the user and supported by the distribution manager. The web service and interactive user interface provide data "pull" capabilities from the repository, and the distribution manager provides a data "push."

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A computerized non-event based method for effectuating a search of unstructured information to provide for rapid querying of the unstructured information utilizing spatial searching, comprising the step of:

providing a search tool which when programmed constitutes a particular machine used with existing documents stored in a computer having unstructured textual geographical location information, excluding previously encoded spatial metadata the search tool:

ascertaining either implicit or explicit indications of geographical location by ascertaining from document text places or things described in the existing document;

storing the documents in the computer with geographical location attributes as metadata;

searching the stored documents in terms of metadata utilizing geographical location search terms; and, returning documents having metadata corresponding to the geographical location search term, the particular machine being reconfigured upon performance of the ascertaining, storing, searching and returning steps, such that a non-event based method is provided that relies on document analysis.

2. The method of claim 1, wherein said storing step includes storing new documents having unstructured data, the unstructured data being mandatorily assigned metadata tags relating to geographical location attributes.

3. The method of claim 1, and further including in the searching step the step of returning documents having metadata other than geographical location metadata, thus to enable precise searches that combine geographical location values and other values.

4. The method of claim 3, wherein the other values are taken from the group consisting of author, publication date range, text, and word matches.

5. A computerized non-event based method for providing a combined search of geographical location and other attributes of unstructured information in documents, comprising the step of providing a search tool which when programmed constitutes a particular machine for:

ingesting and parsing an existing document having unstructured textual geographical location data, excluding non-textual geodata including the step of scanning the unstructured textual data for both implicit and explicit geographical location references and for geographical location meta-tagging the scanned existing document;

storing the existing document with geographical location references as metadata in a content management system repository;

ingesting new documents, including the step of providing each new document with mandatory metadata having at least one geographical location reference;

storing the ingested new document with its geographical location reference as metadata in the content management system repository;

publishing documents having geographical location metadata in the content management system repository;

text-indexing the published documents by providing each of the documents with a text index;

loading the text-indexed published documents into a distribution system for storage; and, accessing the distribution system with a search query including at least a geographical location definition query, the particular machine being reconfigured upon performance of the steps performed thereby, such that a non-event based method relying on document analysis is provided.

6. The method of claim 5, wherein the distribution system is also queried utilizing free text.

7. The method of claim 5, wherein the distribution system is also queried with non-spatial attributes.

8. The method of claim 5, wherein the distribution system is also queried using faceted navigation.

9. The method of claim 5, wherein the distribution system is queried using a search web service.

10. The method of claim 5, wherein the distribution system is searched using a user interface.

11. The method of claim 5, wherein the distribution system is queried in response to a query from a distribution manager set up to return documents from the distribution system requested by a user.

12. The method of claim 11, wherein the distribution manager queries are based on a subscription system.

13. Spatially-enabled non-event based content management apparatus for the discovery and distribution of geographical location unstructured information, comprising:

an ingester for ingesting and parsing existing documents having unstructured textual geographical location information, said ingestion including an input translator for scanning the unstructured information in a document to generate at least one meta-tag relating to a geographical location within the document;

a content management system repository storing the meta-tagged documents; and, a search engine including a query system for searching said documents using associated metadata to return documents having geographical location reference metadata relating to a spatial search.

14. The apparatus of claim 13, and further including a storage and distribution system coupled to said content management system repository having a read-only memory for storing the documents with associated metadata so as to provide a geographical location enabled content management system in which unstructured information may be data mined for location references.

15. The apparatus of claim 14, wherein said search engine includes a module for generating a search query including not only a geographical location reference but also other search query terms, such that information is returned from said search engine as a result of geographical location, attribute and text searching.

16. Spatially-enabled content management apparatus for the discovery and distribution of unstructured geographical location information, comprising:

a new document having unstructured textual geographical location information;

an analyzer for analyzing the new document for a geographical textual location reference;

a metadata tagger for tagging the new document with metadata at least relating to a said geographical location reference;

a content management system repository storing only meta-tagged documents having a geographical location meta-tag, whereby geographical location meta-tagging is mandatory; and, a search engine including a query system for searching said documents using associated metadata to return documents having geographical location reference metadata relating to a geographical location search.

17. The apparatus of claim 16, and further including a storage and distribution system coupled to said content management system repository having a read-only memory for storing the documents with associated metadata so as to provide a geographical location enabled content management system in which unstructured information may be data mined for location references.

18. The apparatus of claim 16, wherein said search engine includes a module for generating a search query including not only a geographical location reference but also other search query terms, such that information is returned from said search engine as a result of focused geographical location, attribute and text searching.

* * * * *